United States Patent [19]

Homma et al.

[11] Patent Number: 4,775,713

[45] Date of Patent: Oct. 4, 1988

[54] AQUEOUS DISPERSION AND PROCESS FOR PREPARATION THEREOF

[75] Inventors: Shiro Homma, Iwakuni; Masatoshi Kashiwagi, Yuu-cho; Mutsuhiro Tanaka, Otake, all of Japan

[73] Assignee: Mitsui Petrochemical Industries, Ltd., Tokyo, Japan

[21] Appl. No.: 135,520

[22] Filed: Dec. 16, 1987

Related U.S. Application Data

[63] Continuation of Ser. No. 758,780, Jul. 25, 1985, abandoned.

[30] Foreign Application Priority Data

Jul. 25, 1984 [JP] Japan ................................ 59-153039
Jul. 26, 1984 [JP] Japan ................................ 59-154040
Aug. 28, 1984 [JP] Japan ................................ 59-177550
Jul. 9, 1985 [JP] Japan ................................ 60-149276
Jul. 16, 1985 [JP] Japan ................................ 60-155209

[51] Int. Cl.$^4$ ............................................. C08L 37/00
[52] U.S. Cl. .................................... 524/517; 524/500; 524/502; 524/504; 524/522; 524/523; 524/527

[58] Field of Search ............... 524/500, 502, 504, 517, 524/522, 523, 527

[56] References Cited

U.S. PATENT DOCUMENTS 4,174,335  11/1979  Ohdaira et al. .................... 525/191

Primary Examiner—Joseph L. Schofer
Assistant Examiner—J. M. Reddick
Attorney, Agent, or Firm—Sherman and Shalloway

[57] ABSTRACT

When a hydrophobic thermoplastic resin such as an olefin resin and a water-insoluble or non-water-swelling polymer containing a carboxylic acid salt group are melt-kneaded in the presence of water, phase inversion of forming a dispersion comprising water as the dispersion medium phase and resin particles as the dispersed phase is caused even if the amount of water is very small. If an anionic surfactant, optionally together with a solvent or oil, is made present in the composition to be melt-kneaded, the size of dispersed particles can be greatly reduced in the formed aqueous dispersion even if a resin having a very high molecular weight or a high melt viscosity is used.

13 Claims, 2 Drawing Sheets

AQUEOUS DISPERSION AND PROCESS FOR PREPARATION THEREOF

This application is a continuation of application Ser. No. 758,780 filed July 25, 1985, now abandoned.

BACKGROUND OF THE INVENTION

(1) Field of the Invention

The present invention relates to an aqueous dispersion of a hydrophobic resin capable of forming a resin film excellent in water resistance, oil resistance, chemical resistance and adhesion to a hydrophobic material, and a process for the preparation of this aqueous dispersion.

More particularly, the present invention relates to an aqueous dispersion of a hydrophobic resin, in which the hydrophobic resin is maintained in the form of oil-in-water type dispersed particles even if the water content is very low. Furthermore, the present invention relates to a process for preparing an aqueous dispersion, according to which not only the above-mentioned aqueous dispersion but also an aqueous dispersion having a high water content can be freely prepared.

(2) Description of the Prior Art

Various aqueous dispersions of polymers are known. For example, a flowable aqueous dispersion having a water content higher than about 30% by weight (hereinafter referred to as "liquid dispersion") is coated and dried on the surface of a paper or fibrous article, a plastic molded article, a wood article or a metal to form a resin film imparting water resistance, oil resistance and chemical resistance to the substrate or is used as a heat-sealing agent. Since water is used as a dispersion medium in this aqueous dispersion, the dispersion is advantageous over solvent type dispersions because there is no problem of ignition or environmental pollution and the dispersion can be easily handled. Accordingly, aqueous dispersions of this type are widely used in various fields.

As another type, there is known an aqueous dispersion which has no flowability and is seemingly solid (hereinafter referred to as "solid dispersion"). Namely, this emulsion is powdery and called "powder emulsion", and when water is added to this solid emulsion, re-dispersion is caused to form a liquid aqueous dispersion. This solid dispersion does not contain water at all, or if it contains water, the water content is 2 to 3% by weight at highest. Accordingly, there is no risk of freezing at a low temperature, packaging or transportation is simplified, and a narrow space is sufficient for the storage. Moreover, the solid dispersion can be mixed directly with a powder or granules for which the contact with water is not desired, such as cement, mortar or gypsum, and a composition having a high processability can be prepared.

Known solid dispersions cannot be prepared by the same process as adopted for the preparation of liquid aqueous dispersions. Namely, this solid dispersion is prepared by once forming a liquid aqueous dispersion having a higher water content according to various known processes and spraying the liquid aqueous dispersion in hot air in a furnace by a sprayer to evaporate water and recover a powder. This process, however, is disadvantageous in that when a liquid aqueous dispersion of a polymer having a low softening temperature is used as the starting material, agglomeration of polymer particles is caused at the spraying step or the formed powdery emulsion is aggregated into a bulk under the action of heat or pressure. Even if water is added to this powder emulsion to effect re-dispersion, dispersion is not smoothly effected or even if dispersion is effected, the viscosity is increased to degrade physical properties of the formed coating film. In order to eliminate this disadvantage, an additive such as an anti-sticky agent or a protecting colloid is added to a liquid aqueous dispersion before spraying or to a powder before drying, but if the additive is not incorporated in an extremely large amount, no satisfactory effect is obtained, and if the amount of the additive is increased, the physical properties of the formed coating film are degraded. Moreover, since water contained at a high content is evaporated, energy loss is great and the process is economically disadvantageous. Therefore, development of a technique of preparing a solid dispersion such as a powder emulsion while reducing the amount of an additive to a level as low as possible by a process having reduced energy loss has been eagerly desired.

Moreover, improvements are desired also in the process for the production of liquid aqueous dispersions. The known process is roughly divided into a process in which emulsion polymerization is carried out in an emulsion medium in the presence of an emulsifier and a process in which a molten resin is stirred and mixed with an aqueous medium under a shearing force. The former process is defective in that the kinds of resins to be formed by polymerization are limited, and control of the polymerization reaction is complicated and a complicated apparatus has to be used. On the other hand, the latter process is advantageous in that the process can be applied to any resin and the operation and apparatus are relatively simple.

Various proposals have been made on the latter process. For example, Japanese Patent Application Laid-Open Specification No. 12835/76 discloses a process in which a kneaded mixture of a thermoplastic resin and a water-soluble polymer is dispersed in water. However, since a film formed from an aqueous dispersion prepared according to this process contains a water-soluble polymer, the film is poor in the mechanical strength or water resistance. Japanese Patent Publication No. 23703/82 discloses a process in which a kneaded mixture of polypropylene and a dispersant selected from a surfactant and a water-soluble or water-swelling polymer is dispersed in water. The particle size of dispersed particles is relatively large, and in order to reduce the particle size, it is necessary to use a petroleum resin in combination. Accordingly, a film obtained from an aqueous dispersion prepared according to this process is sticky. Japanese Patent Application Laid-Open Specification No. 2149/81 discloses a process in which an aqueous dispersion is prepared by dispersing an olefin resin with an aqueous solution of partially saponified polyvinyl alcohol. Since the dispersion contains a water-soluble resin, the physical properties of a film formed from the dispersion are poor. Moreover, the dispersion obtained according to this process is a liquid dispersion having a water content higher than 30% by weight. Moreover, Japanese Patent Publication No. 42207/83 discloses a technique of forming a dispersion by melt-kneading a polyolefin with a carboxyl group-containing polyolefin, feeding the mixture in hot water containing a basic substance and applying a shearing force to the mixture. This process is advantageous in that the obtained dispersion does not contain a water-soluble or water-swelling polymer or a petroleum resin is not used. However, if it is intended to prepare a product having a small dispersed particle size, the kinds of starting resins are limited. Moreover, since the dispersing step is carried out at a high temperature under a high pressure, a vessel having a pressure resistance should be used for the dispersing operation. In the foregoing processes proposed for preparing aqueous dispersions, development of means of forming an aqueous dispersion of fine particles without using a water-soluble or water-swelling polymer or a petroleum resin, which can be applied to all the resins, is eagerly desired.

Furthermore, development of a process in which a liquid aqueous dispersion and a solid dispersion can be optionally and freely prepared without adopting any special step is desired.

SUMMARY OF THE INVENTION

Under this background, we made research, and as the result, it was found that when a hydrophobic thermoplastic resin is melt-kneaded with a water-insoluble or non-water-swelling, carboxylic acid salt group-containing thermoplastic polymer in the presence of a limited amount of water, phase inversion, that is, conversion of water to the dispersion medium phase and the solids to the dispersed particle phase, is caused to occur and an apparently solid aqueous dispersion is obtained, and that if this phase inversion is once caused, by supplying an additional amount of water in the system or from the outside of the system, an aqueous dispersion in which the water content can be freely adjusted within a broad range can be obtained.

Moreover, it was found that if an anionic surfactant, a solvent or an oiling agent is made present in the above composition, an aqueous dispersion having a small dispersed particle size can be prepared from even a resin having a high melt viscosity.

It is therefore a primary object of the present invention to provide an aqueous dispersion which is characterized in that the resin solids are dispersed in the form of oil-in-water particles having a small particle size even when the water content is extremely low and by addition of water, the solids are uniformly dispersed in the aqueous phase.

Another object of the present invention is to provide an aqueous dispersion in which the size of dispersed particles is controlled to a very small value even though a water-soluble or water-swelling component is not contained.

Still another object of the present invention is to provide a process for preparing an aqueous dispersion, in which phase inversion is caused at a low water content.

Still another object of the present invention is to provide an aqueous dispersion in which the dispersed particle size is controlled to a very small value even if the melt viscosity of the resin is high, and a process for the preparation of this aqueous dispersion.

A further object of the present invention is to provide a process for the preparation of an aqueous dispersion of a thermoplastic resin in which the dispersion can be prepared at a reduced energy cost without using a large-scale apparatus.

In accordance with one fundamental aspect of the present invention, there is provided an aqueous dispersion comprising (i) a hydrophobic thermoplastic resin, (ii) a water-insoluble or non-water-swelling thermoplastic polymer containing a carboxylic acid salt group bonded to the polymer chain at a concentration of 0.1 to 5 millimole equivalents as

per gram of the polymer, and water, wherein the water content is 3 to 90% by weight, preferably 3 to 25% by weight, the electric resistance value is smaller than $10^6 \Omega$-cm and the dispersion has such a characteristic that the solids are uniformly dispersed in the aqueous phase by addition of water.

In accordance with another aspect of the present invention, there is provided an aqueous dispersion set forth above, wherein (iii) an anionic surfactant is contained in addition to the above components (i) and (ii).

In accordance with still another aspect of the present invention, there is provided an aqueous dispersion set forth above, wherein (iii) an anionic surfactant and (iv) an organic solvent are contained in addition to the above components (i) and (ii).

In accordance with still another aspect of the present invention, there is provided an aqueous dispersion set forth above, wherein (iii) an anionic surfactant and (v) a natural oil or synthetic oil having a number average molecular weight of at least 200 are contained in addition to the above components (i) and (ii).

Moreover, in accordance with the present invention, there is provided a process for the preparation of aqueous dispersions, which comprises the step of melt-kneading, as indispensable components, (a) a hydrophobic thermoplastic resin and (b) a neutralizable and/or saponifiable thermoplastic polymer containing a carboxylic acid or its anhydride or ester bonded to the polymer chain at a concentration of at least 0.1 millimole equivalent as

per gram of the polymer or a thermoplastic polymer having a carboxylic acid salt group bonded at the polymer chain at a concentration of 0.1 to 5 millimole equivalents as

per gram of the polymer, said thermoplastic polymer being water-insoluble or non-water-swelling in the carboxylic acid group-containing state, and as optional components (c) an anionic surfactant or an organic compound forming an anionic surfactant by reaction with a basic substance or a combination of said component (c) and (d) an organic solvent or (e) a natural oil or synthetic oil having a number average molecular weight of at least 200, the step of adding water, a base in an amount sufficient to form 0.1 to 5 millimole equivalents of a carboxylic acid salt group when the component (b) is in the non-neutralized state and a base in an amount sufficient to form an anionic surfactant when the component (c) is in the non-neutralized state and melt-kneading the mixture to cause phase inversion to form an aqueous dispersion of the resin solids, said two steps being conducted simultaneously or in the recited order, and, if necessary, the step of adding an additional amount of water to the resulting aqueous dispersion.

DETAILED DESCRIPTION OF THE INVENTION

Figure 1:
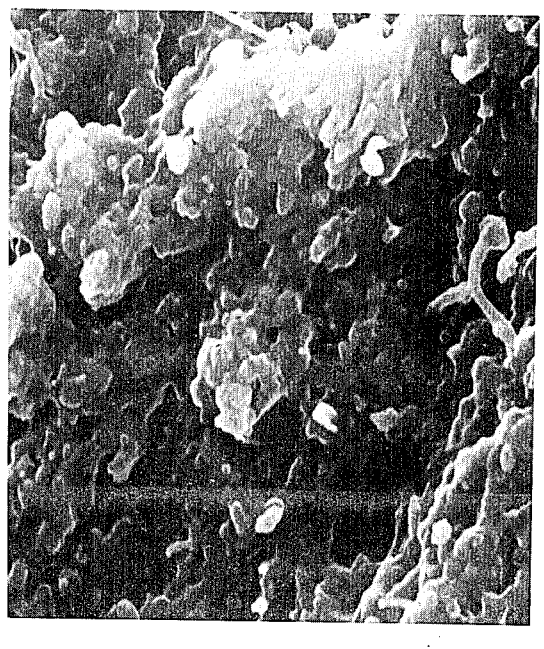
FIG. 1 is an electron microscope photograph illustrating the structure of particles of a solid aqueous dispersion according to one embodiment (two-component type dispersion) of the present invention.

The present invention will now be described in detail.

COMPONENTS

The thermoplastic resin (i) as one of the constituent components of the aqueous dispersion of the present invention is water-insoluble and non-water-swelling and has no water dispersibility. For example, there can be mentioned polyolefins such as low density polyethylene, high density polyethylene, polypropylene, poly-1-butene, poly-4-methyl-1-pentene and random and block copolymers of α-olefins such as ethylene, propylene, 1-butene and 4-methyl-1-pentene, ethylene-vinyl compound copolymers such as an ethylene-vinyl acetate copolymer, an ethylene-vinyl alcohol copolymer and an ethylene-vinyl chloride copolymer, styrene resins such as polystyrene, an acrylonitrile-styrene copolymer, an ABS resin and an α-methylstyrene-styrene copolymer, polyvinyl compounds such as polyvinyl chloride, polyvinylidene chloride, a vinyl chloride-vinyldiene chloride copolymer, polymethyl acrylate and polymethyl methacrylate, polyamides such as nylon 6, nylon 6-6, nylon 6-10, nylon 11 and nylon 12, thermoplastic polyesters such as polyethylene terephthalate and polybutylene terephthalate, polycarbonates, polyphenylene oxides, and mixtures thereof.

An olefin resin is especially preferred among these thermoplastic resins. As the polyolefin, there can be mentioned homopolymers and copolymers of α-olefins such as ethylene, propylene, 1-butene, 3-methyl-1-butene, 4-methyl-1-pentene, 1-heptene, 1-hexene, 1-decene and 1-dodecene, represented by polyethylene, polypropylene, poly-1-butene, poly-4-methyl-1-pentene, poly-3-methyl-1-pentene, an ethylene-propylene copolymer, an ethylene-1-butene copolymer and a propylene-1-butene copolymer, copolymes of an α-olefin with a conjugated diene or unconjugated diene, represented by an ethylene-butadiene copolymer and an ethylene-ethyldiene-norbornene copolymer, and copolymers of at least two α-olefins with a conjugated diene or unconjugated diene, represented by an ethylene-propylene-butadiene terpolymer, an ethylene-propylene-dicyclopentadiene terpolymer, an ethylene-propylene-ethyldiene-norbornene terpolymer and an ethylene-propylene-1,5-hexadiene terpolymer. Homopolymers and copolymers of α-olefins are especially preferred.

It is preferred that the melt flow rate (as determined according to ASTM D-1238; hereinafter referred to as "MFR") of the thermoplastic resin (i) be at least 1 g/10 min, especially at least 5 g/10 min. If MFR is lower than 1 g/10 min, the melt viscosity is too high and melt-kneading becomes difficult, and a preferred aqueous dispersion can hardly be obtained.

However, according to another embodiment of the present invention, as described hereinafter, by using an anionic surfactant and an organic solvent in combination, an aqueous dispersion of a resin having a melt flow rate of substantially zero, for example, an ultra-high molecular weight olefin resin having a weight average molecular weight ($\overline{M}w$) of at least 500,000, can be prepared.

As the thermoplastic polymer (ii) as another constituent component of the present invention, there can be mentioned a polymer formed by introducing into a thermoplastic resin as mentioned above or a monomer constituting said thermoplastic resin a monomer having a neutralized or unneutralized carboxylic acid group or a saponified or unsaponified carboxylic acid ester group by such means as graft copolymerization, block copolymerization or random copolymerization and, according to need, performing neutralization or saponification with a basic substance, so that the total amount of the carboxylic acid salt formed in the polymer is 0.1 to 5 millimole equivalents, especially 0.2 to 4 millimole equivalents, as

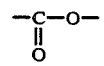

per gram of the polymer. A polymer in which an unneutralized or unsaponified carboxylic acid or carboxylic acid ester group is copresent, that is, a partially neutralized or saponified polymer, may be used. The thermoplastic polymer (ii) should not be water-soluble or water-swelling. If the total amount of the neutralized carboxylic acid group and/or saponified carboxylic acid ester group is outside the above-mentioned range, the thermoplastic polymer (ii) does not exert the function of assisting dispersion of the thermoplastic resin (i), and no good dispersion can be obtained. If the thermoplastic polymer (ii) is water-soluble or water-swelling, the physical properties of a film formed from the dispersion are degraded.

The polymer to be used as the starting material when the thermoplastic polymer (ii) is formed by post neutralization or post saponification is a copolymer of the same monomer as the monomer constituting the thermoplastic resin (i), especially an α-olefin, with an ethylenically unsaturated carboxylic acid or an ester thereof. As the unsaturated carboxylic acid, there can be mentioned acrylic acid, methacrylic acid, maleic acid, fumaric acid, tetrahydrophthalic acid, itaconic acid, citraconic acid, crotonic acid, isocrotonic acid, Nadic Acid ® (endo-cis-bicyclo(2,2,1)hepto-5-ene-2,3-dicarboxylic acid), maleic anhydride and citraconic anhydride. As the unsaturated carboxylic acid ester, there can be mentioned methyl, ethyl and propyl monoesters and diesters of the above-mentioned unsaturated acids. Of course, as is apparent to those skilled in the art, a thermoplastic polymer to be subjected to post neutralization or post saponification may be obtained by graft-polymerizing an ethylenically unsaturated carboxylic acid or its anhydride or ester to a thermoplastic resin (i) as mentioned above, for example, an olefin resin, instead of copolymerizing a plurality of monomer components.

The amount introduced of the ethylenically unsaturated carboxylic acid or its anhydride or ester should be sufficient to give a carboxylic acid salt concentration specified in the present invention. Namely, the amount of the ethylenically unsaturated carboxylic acid or its anhydride or ester should be at least 0.1 millimole, preferably 0.1 to 5 millimoles, as

per gram of the polymer.

As the basic substance to be used for neutralization and saponification, there can be mentioned a metal or the like acting as a base in water, such as an alkali metal, an alkaline earth metal, ammonia or an amine, a substance acting as a base in water, such as an oxide, hydroxide, weak acid salt or hydride of an alkali metal or an oxide, hydroxide, weak acid salt or hydride of an alkaline earth metal, and an alkoxide of a metal as mentioned above. Specific examples are as follows.

(1) Alkali metals such as sodium and potassium, and alkaline earth metals such as calcium, strontium and barium.

(2) Amines such as inorganic amines, for example, hydroxylamine and hydrazine, and methylamine, ethylamine, ethanolamine and cyclohexylamine.

(3) Oxides, hydroxides and hydrides of alkali metals and alkaline earth metals such as sodium oxide, sodium peroxide, potassium oxide, potassium peroxide, calcium oxide, strontium oxide, barium oxide, sodium hydroxide, potassium hydroxide, calcium hydroxide, strontium hydroxide, barium hydroxide, sodium hydride, potassium hydride and calcium hydride.

(4) Weak acid salts of alkali metals and alkaline earth metals such as sodium carbonate, potassium carbonate, sodium hydrogencarbonate, potassium hydrogencarbonate, calcium hydrogencarbonate, sodium acetate, potassium acetate and calcium acetate.

(5) Ammonia and amines such as ammonium hydroxide and quaternary ammonium compounds, for example, tetramethyl ammonium hydroxide and hydrazine hydrate.

As the carboxylic acid group or carboxylic acid ester group neutralized or saponified by the basic substance, alkali metal carboxylates such as sodium carboxylate and potassium carboxylate and ammonium carboxylate, especially potassium carboxylate, are preferred.

A thermoplastic polymer (ii) having a good compatibility with the thermoplastic resin (i) is preferably selected. More specifically, when an aqueous dispersion of an olefin resin is intended, a polymer containing an olefin monomer in the main chain should be selected. For example, when a polyolefin such as polyethylene or an ethylene-vinyl acetate copolymer is used, it is preferred that a neutralization or saponification product of a maleic acid-grafted polyethylene or ethylene-vinyl acetate copolymer or an ethylene-(meth)acrylic acid copolymer or ethylene-methyl (meth)acrylate copolymer be selected. As one criterion to be used for selecting appropriate thermoplastic polymers, there can be mentioned a solubility parameter (Sp value). Namely, it is preferred that the difference of the solubility parameter between the starting polymer before neutralization or saponification and the thermoplastic resin (i) be less than 2 $(cal/cm^3)^{\frac{1}{2}}$, especially less than 1 $(cal/cm^3)^{\frac{1}{2}}$.

In the instant specification, the solubility parameter (Sp value) has the ordinary meaning. Namely, it is defined as the square root of the cohesion energy density. The solubility parameter is calculated from the value Vi of contribution of the atomic group to the molar volume and the cohesion energy En of the atomic group, as shown in D. W. Van Klevelen, "Properties of Polymers" (Elsevier, 1972), according to the following equation:

$$SP = \left(\frac{\Sigma Eni}{\Sigma Vi}\right)^{\frac{1}{2}} (cal/cm^3)^{\frac{1}{2}}$$

Any of anionic surfactants formed by reaction with basic substances can be used as the anionic surfactant (iii) as an optional component. For example, there can be mentioned primary higher fatty acid salts, secondary higher fatty acid salts, primary higher alcohol sulfuric acid ester salts, secondary higher alcohol sulfuric acid ester salts, primary higher alkylsulfonic acid salts, secondary higher alkylsulfonic acid salts, higher alkyl disulfonic acid salts, sulfonated higher fatty acid salts, higher fatty acid sulfuric acid ester salts, higher fatty acid ester sulfonic acid salts, higher alcohol ether sulfuric acid ester salts, higher alcohol ether sulfonic acid salts, higher fatty acid amide alkylolated sulfuric acid ester salts, alkylbenzene sulfonic acid salts, alkylphenol sulfonic acid salts, alkylnaphthalene sulfonic acid salts and alkylbenzimidazole sulfonic acid salts. Specific examples of these surfactants are disclosed in Hiroshi Horiguchi, "Synthetic Surfactants" (published by Sankyo Shuppan, 1966). Among these surfactants, alkali metal salts of higher fatty acids, especially saturated and unsaturated higher fatty acids having 10 to 20 carbon atoms, are preferred. For example, there can be mentioned alkali metal salts of saturated fatty acids such as capric acid, undecanoic acid, lauric acid, myrstic acid, palmitic acid, margaric acid, stearic acid and arachic acid, and unsaturated fatty acids such as linderic acid, zudic acid, petroselinic acid, oleic acid, linoleic acid, linolenic acid and arachidic acid, and mixtures thereof.

Any of organic solvents capable of dissolving (swelling) the thermoplastic resin (i) and thermoplastic polymer (ii) can be used as the organic solvent (iv) as an optional component. For example, there can be mentioned aromatic hydrocarbons such as benzene, toluene, xylene, styrene, α-methylstyrene and divinylbenzene, aliphatic hydrocarbons such as hexane and heptane, and halogenated hydrocarbons such as trichloroethylene. This organic solvent may be contained in the final aqueous dispersion or may be removed by such means as distillation and azeotropic distillation. For example, when removal is effected by distillation, it is preferred that the boiling point of the solvent be lower than 100° C.

In the present invention, the solvent is used for partially dissolving or swelling the thermoplastic resin (i), and the amount used of the solvent is much smaller than in the conventional solvent process.

As the natural oil or synthetic oil (v) used as an optional component, there can be used mineral lubricating oils such as spindle oil and machine oil, mineral oils such as liquid paraffin, electrically insulating oil and process oil, synthetic oils such as alkylbenzene oil, diolefin oil, diester oil and alkyl naphthenate oil, and vegetable oils such as castor oil, linseed oil, rape oil, coconut oil and tall oil. In order to stably maintain the oil in the resin solids, it is indispensable that the oil should have a number average molecular weight of at least 200.

COMPOSITION, STRUCTURE AND CHARACTERISTICS OF AQUEOUS DISPERSION

It is preferred that the ratio of thermoplastic polymer (ii) to the thermoplastic resin (i) be such that the amount of the thermoplastic polymer (ii) be 1 to 60 parts by weight, especially 2 to 50 parts by weight, per 100 parts by weight of the thermoplastic resin (i). If the amount of the thermoplastic polymer (ii) is too small and below the above range, dispersion of the thermoplastic resin (i) is not sufficient, and if the amount of the thermoplastic polymer is too large and exceeds the above range, the properties of the dispersion become different from the inherent properties of the thermoplastic resin (i).

The aqueous dispersion according to the first embodiment of the present invention contains water in addition to the above-mentioned components. The water content is 3 to 90% by weight, especially 5 to 70% by weight, based on the total aqueous dispersion.

One type of the aqueous dispersion of the present invention, that is, an apparently solid aqueous dispersion, contains water in an amount of 3 to 25% by weight. If the water content is lower than 3% by weight, no aqueous dispersion can be obtained. If the water content exceeds 25% by weight, an aqueous dispersion having a flowability is formed. Namely, if the water content is in the range of from 3 to 25% weight, there is formed an apparently solid aqueous dispersion having properties described below.

The most important feature of this embodiment of the present invention is that phase inversion is caused in a molten mixture of the above-mentioned thermoplastic resin (i) and the carboxylic acid salt type thermoplastic polymer (ii) in the presence of such a small amount as 3 to 25% by weight of water. Namely, the present invention is based on the finding that as the result of this phase inversion, a dispersion state of the O/W type comprising a dispersion medium phase of water and a dispersed phase of fine particles of resin solids can be stably fixed. Of course, according to the present invention, a liquid aqueous dispersion can be obtained by adding an additional amount of water during the preparation process or separately from the preparation process. It must be noted that also in this case, phase inversion per se is caused in the presence of such a small amount as 3 to 25% by weight of water.

FIG. 1 of the accompanying drawings is an electron microscope photograph (3000 magnifications) illustrating the structure of particles of a seemingly solid aqueous dispersion (two-component type) according to the present invention. From this photograph, it is understood that secondary particles of the solid aqueous dispersion according to the present invention consist of considerably densely agglomerated fine primary particles which are slightly deformed. From various facts described below, it is proved that these primary particles take an oil-in-water type dispersion state.

Another property of the aqueous dispersion is an electric resistance value of less than $10^6$ $\Omega$-cm, and most of aqueous dispersions have an electric resistance value smaller than $10^5$ $\Omega$-cm. It is presumed that the reason why the dispersion has such a low electric resistance value is that the continuous phase of the dispersion is composed of water and the resin constitutes the discontinuous phase. Namely, in case of a dispersion where a resin constitutes the continuous phase or a resin powder merely containing less than 25% by weight of water, the electric resistance value is one inherently possessed by the resin (ordinarily $10^7$ to $10^{18}$ $\Omega$-cm and at least $10^{10}$ $\Omega$-cm in many cases).

Still another property is that when water is added to the aqueous dispersion, the solids are uniformly dispersed in the aqueous phase. Also from this property, it is presumed that the continuous phase is composed of water.

Incidentally, the electric resistance value referred to in the instant specification is one determined according to the method in which a dispersion is pressed in an insulator vessel having a 1-cm cubic form, to each of both the inner sides of which a 1-cm square electrode is bonded, and the resistance value between the electrodes is measured at 60 Hz by using an alternating current resistance measuring device. State of dispersion by addition of water can be confirmed by throwing a dispersion into cold water, stirring the mixture by an ordinary stirrer having turbine vanes, filtering the dispersion through a metal net having a size of about 100 mesh and observing particles in the dispersion by a microscope or the like.

Dispersed particles of the dispersion of the present invention are substantially spherical particles having an average particle size smaller than 10 $\mu$m, especially smaller than 5 $\mu$m.

The particle size can be measured by using Coulter Counter (Model TAII) made by Coulter Electronics.

Figure 2:
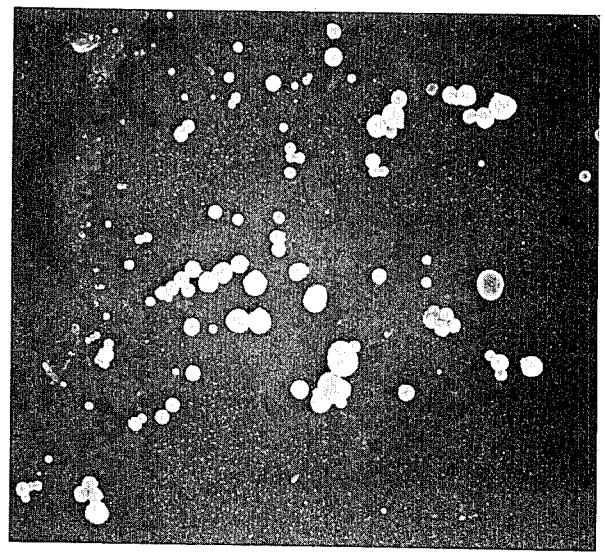
FIG. 2 is an electron microscope photograph illustrating the structure of particles formed by redispersing the solid aqueous dispersion shown in FIG. 1 in water and drying the resulting dispersion.

FIG. 2 of the accompanying drawings is an electron microscope photograph (5000 magnifications) of solid particles obtained by re-dispersing the solid aqueous dispersion shown in FIG. 1 in water and drying the dispersion to remove water. It is seen that the solid particles are substantially spherical fine particles.

A second type of the aqueous dispersion according to the present invention comprises the anionic surfactant (iii) in addition to the above-mentioned components (i) and (ii). It is preferred that the anionic surfactant (iii) be present in an amount of 1 to 40 parts by weight, especially 2 to 30 parts by weight, per 100 parts by weight of the thermoplastic resin (i). If the amount of the component (iii) is too small and below this range, ultra-fine division of dispersed particles intended in this embodiment becomes difficult, and the physical properties of a film formed from the dispersion are degraded.

Figure 3:
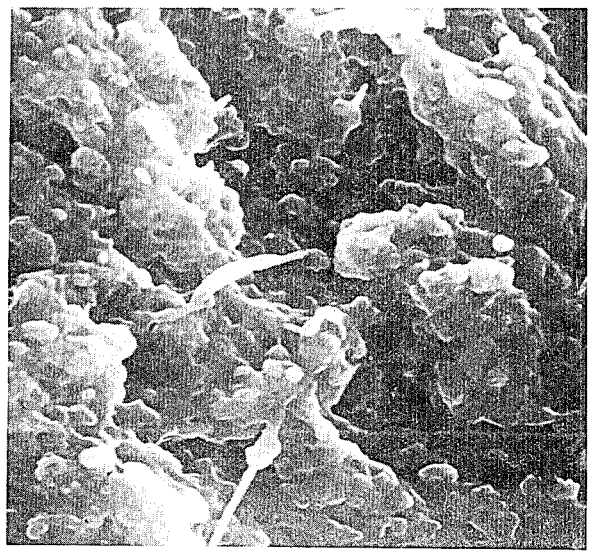
FIG. 3 is an electron microscope photograph illustrating the structure of particles of a solid aqueous dispersion according to another embodiment (three-component type dispersion) of the present invention.

FIG. 3 is an electron microscope photograph (3000 magnifications) illustrating the structure of particles of this solid aqueous dispersion of the three-component type.

Figure 4:
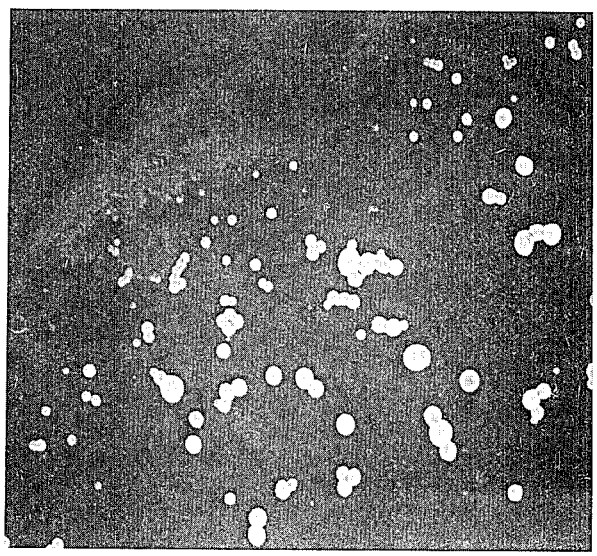
FIG. 4 is an electron microscope photograph illustrating the structure of particles formed by redispersing the solid aqueous dispersion shown in FIG. 3 in water and drying the resulting dispersion.

FIG. 4 is an electron microscope photograph (5000 magnifications) illustrating solid particles obtained by re-dispersing the solid aqueous dispersion shown in FIG. 3 in water and drying the dispersion to remove water. From FIG. 4, it is seen that the solid particles are substantially spherical fine particles.

The properties of the aqueous dispersion of the three-component type according to the second embodiment are the same as those of the aqueous dispersion of the two-component type according to the first embodiment of the present invention except that the number average particle size is so fine as less than 5 $\mu$m, especially less than 2 $\mu$m.

In accordance with a third embodiment of the present invention, the organic solvent (iv) is used in combination with the surfactant (iii). Since the organic solvent is preferably removed from the final aqueous dispersion, this aqueous dispersion is finally in accord with the aqueous dispersion according to the second embodiment. However, it must be understood that according to this embodiment, even a resin having an extremely high melt viscosity, such as an olefin type elastomer or an olefin resin having a super-high molecular weight, can be formed into an aqueous dispersion.

In accordance with a fourth embodiment of the present invention, the oil (v) is used in combination with the surfactant (iii). In this embodiment, the oil (v), unlike the above-mentioned solvent (iv), is left in the aqueous dispersion and is effectively used for softening the resin and finely dispersing the resin solids. It is preferred that the oil (v) be present in an amount of 10 to 500 parts by weight, especially 20 to 300 parts by weight, per 100 parts by weight of the resin (i). If the amount of the oil is too small and below the above-mentioned range, attainment of the effects of softening the resin solids and finely dispersing the resin solids, intended in this embodiment, becomes difficult. If the amount of the oil is too large and exceeds the above-mentioned range, the physical properties of a film formed from the dispersion are degraded.

The properties of the aqueous dispersion of this embodiment are the same as those of the aqueous dispersion of the first embodiment except that the above-mentioned oil is contained and the resin solids are softened.

Each of the aqueous dispersions according to the first through fourth embodiments of the present invention has a low water content and is apparently solid, and if water is added, a liquid aqueous dispersion is readily formed. Accordingly, the aqueous dispersion of the present invention is advantageous in that there is no risk of freezing, the space for the storage can be saved and transportation and packaging can be facilitated. Moreover, the aqueous dispersion of the present invention can be directly incorporated into a powder or granule for which the contact with water is not desired, such as cement, mortar or gypsum. Furthermore, the aqueous dispersion of the present invention can be re-dispersed in water and used for forming a water-resistant, oil-resistant and chemical-resistant coating film on various materials or as a heat-sealing material. According to another application embodiment of the aqueous dispersion of the present invention, a very small shearing force is applied or the dispersion is dried under a very mild temperature condition, whereby a fine powder is obtained or the water content is reduced. Still further, the aqueous dispersion of the present invention can be used as a binder for new ceramics or as a polymer modifier.

The aqueous dispersion in the form of a liquid may be used as a coating material as described above as it is or after it is diluted.

In the aqueous dispersion according to the fourth embodiment, the resin solid particles are in the state softened by the oil, and therefore, the processability of the resin is improved. Furthermore, since the particles per se are very fine, the aqueous dispersion is advantageous in that thin coating is possible. Moreover, if an ethylene-propylene-diene copolymer is used as the thermoplastic resin (i) and it is crosslinked, there can be obtained a soft and elastic rubber and this is advantageously used as a rubber component of an ABS resin.

PROCESS FOR PREPARATION OF AQUEOUS DISPERSION

The aqueous dispersion of the present invention can be prepared according to the step of melt-kneading the components (a) and (b), the components (a), (b) and (c), the components (a), (b), (c) and (d) or the components (a), (b), (c) and (e), and the step of adding water and, if necessary, a basic substance to the melt-kneaded mixture obtained at the first step and melt-kneading the resulting mixture to effect phase inversion, said two steps being conducted simultaneously or in the recited order.

The mixing ratios among the components (a), (b), (c) and (e) are as described hereinbefore. It is preferred that the organic solvent (d) be mixed in an amount of 10 to 1000 parts by weight, especially 20 to 700 parts by weight, per 100 parts by weight of the component (a). In case of a resin having a high melt viscosity, for which the organic solvent has to be used in an amount exceeding the above-mentioned range, it is difficult to disperse the resin in the form of fine particles, and furthermore, opposite phase inversion is readily caused in the resulting dispersion.

A thermoplastic polymer having a carboxylic acid salt group can be used as the component (b), but in view of the step number and from the economical viewpoint, it is preferred that a thermoplastic polymer having an unneutralized carboxylic acid group or an anhydride or ester group thereof be neutralized and neutralization of the polymer be effected simultaneously with phase inversion at the second melt-kneading step. Either an anionic surfactant or an unneutralized organic compound may be used as the component (c).

In the process of the present invention, a plurality of resins are melt-kneaded. The melt-kneading temperature is higher than the melting point of the resin having a higher melting point, preferably a temperature higher than the temperature giving a melt viscosity lower than $10^6$ poise, especially lower than $10^5$ poise. When the component (d) or (e) is used, the melt-kneading temperature need not be higher than the melting point of the resin having a higher melting point, but the temperature condition may be such that the melt viscosity of the composition is within the above mentioned range.

Known melt-kneading means can be adopted in carrying out the process of the present invention. For example, melt kneading can be preferably accomplished by using a kneader, a Banbury mixer or a multi-shaft screw extruder.

In the process of the present invention, melt kneading of the thermoplastic resin (i) with the thermoplastic polymer (ii) is accomplished in the presence of water in a limited amount of 3 to 25% by weight, and phase inversion of the resin solids to the O/W type dispersion can be effected. Water may be added to the melt-kneading system in an amount of 25 to 90% by weight according to need, but even in this case, phase inversion per se is effected at the stage where the amount added of water is within the range of from 3 to 25% by weight. Of course, when the total amount added of water is 3 to 25% by weight, a solid aqueous dispersion is obtained, and when the amount added of water is larger than 25% by weight, especially 35% by weight, a liquid aqueous dispersion having a flowability is obtained. The upper limit of the amount added of water is not particularly critical, but in view of uses of the aqueous dispersion, the amount added of water is up to 90% by weight.

When the basic substance is post-added, the basic substance mentioned above may be directly added, but it is preferred that the basic substance be added in the form of an aqueous solution. The basic substance is added in an amount sufficient to effect neutralization or saponification to such an extent that the amount of the carboxylic acid formed in the thermoplastic polymer (b) by neutralization and/or saponification is 0.1 to 5 millimole equivalents as

per gram of the polymer and also in an amount sufficient to convert the organic compound as the component (c) to an anionic surfactant.

The aqueous dispersion formed by sequentially adding water and carrying out melt kneading is then naturally or artificially cooled to room temperature. During this cooling, the dispersed particles are solidified and a stable dispersion is obtained.

When the solvent is used, the solvent is removed by such means as evaporation according to need.

Of course, in preparing the dispersion of the present invention, there may be used various subsidiary materials customarily used for aqueous dispersions, such as an anionic surfactant, a non-ionic surfactant, other dispersant, an emulsifier, a stabilizing agent, a wetting agent, a tackifier, a foaming agent, a defoaming agent, a coagulant, a gelling agent, an antioxidant, a softener, a plasticizer, a filler, a colorant, a flavoring agent, a sticking-preventing agent and a parting agent.

The present invention will now be described in detail with reference to the following examples that by no means limit the scope of the invention. Incidentally, all of "parts" in the examples are by weight unless othewise indicated.

EXAMPLE 1

A compression type kneader was charged with 100 parts of an ethylene-1-butene copolymer resin (ethylene content=93 mole%, MFR=15 g/10 min, density=0.89 g/cm$^3$, Sp value=7.84 (cal/cm$^3$)$^{1/2}$) as the thermoplastic resin and 10 parts of an ethylene-acrylic acid copolymer (A-C Polyethylene ®5120 supplied by Allied Chemical, acrylic acid content=15% by weight,

group content=2.14 millimole equivalents/g, viscosity=650 cps (140° C.), density=0.93 g/cm$^3$, Sp value=8.58 (cal/cm$^3$)$^{1/2}$ as the thermoplastic polymer, and the mixture was melt-kneaded at 140° C. for 30 minutes.

Then, 20 parts of an aqueous alkali solution containing 1.20 parts (1.0 chemical equivalent) of potassium hydroxide necessary for neutralizing all of the carboxylic acid contained in the thermoplastic polymer was pressed into the kneader over a period of 5 minutes by using a pump connected to the kneader. The pressure in the kneader was elevated to 3 kg/cm$^2$G.

Then, kneading was conducted for 30 minutes, and the temperature in the kneader was lowered to 60° C. and the content was taken out. The content was a white solid.

This white solid was packed in a 1-cm cubic vessel and the electric resistance value was measured. It was found that the electric resistance value was 5×10$^3$ Ω-cm. Separately, 10 parts of the white solid was thrown in 10 parts of water and the mixture was stirred by a turbine vane stirrer, and when the formed dispersion was filtered through a 100-mesh net, no residual solid was observed on the net. This dispersion had a solid concentration of 42% by weight, a viscosity of 120 cps and a pH value of 9.9. When the size of dispersed particles was measured by Coulter Counter, it was found that the average particle size was 1.5 μm. When the amount of the formed carboxylic acid salt was measured by using an infrared spectrophotometer, it was found that the amount of the formed carboxylic acid salt was 2.0 millimole equivalents as

per gram of the thermoplastic polymer.

EXAMPLES 2 THROUGH 10

In the same manner as described in Example 1, aqueous dispersions were prepared by using ingredients shown in Table 1.

The obtained results are shown in Table 1.

EXAMPLE 11

A 100/10 weight ratio mixture of the same ethylene-1-butene copolymer resin and ethylene-acrylic acid copolymer resin as used in Example 1 was supplied at a rate of 110 parts per hour from a hopper of a biaxial screw extruder of the same direction rotation and engaging type (Model PCM-30 supplied by Ikegai Tekko, L/D=20), and a 20% aqueous solution of potassium hydroxide was continuously supplied at a rate of 6 parts per hour from a supply opening arranged in the vent portion of the above extruder. The mixture was continuously extruded at a heating temperature of 90° C. The product was a white solid. The properties of the product are shown in Table 1.

EXAMPLE 12

In the procedure of Example 1, after pumping 20 parts of alkaline water containing 1.20 parts of potassium hydroxide dissolved in it into the kneader, 90 parts of water was further forced into it, and the melt-kneading was carried out. The kneader was then cooled, and the contents were taken out. The contents were a white liquid having the resin uniformly dissolved in it. It had a solids concentration of 50% by weight, a viscosity of 210 cps and a pH of 10.5, and the dispersed particles had a particle diameter of 1.5 μm on an average. The content of the carboxylate salt formed in the thermoplastic polymer was measured, and found to be 2.0 millimole equivalents/g calculated as the

group.

EXAMPLE 13

The same ethylene-acrylic acid copolymer resin used in Example 1 was emulsified according to the method described in Referential Example 1 given hereinafter.

A compression kneader was charged with 33 parts of the resulting emulsion (having a concentration of 30% by weight) and 100 parts by weight of the same ethylene-1-butene copolymer resin as used in Example 1, and melt kneading was carried out at 140° C. for 30 minutes.

The kneader was cooled and the content was taken out. The content was a white solid. When this white solid was evaluated in the same manner as described in Example 1, it was found that the water content was 17% by weight, the electric resistance value was $6 \times 10^3$ Ω-cm, the dispersion state was good and the average particle size was 5.1 μm.

REFERENTIAL EXAMPLE 1

An autoclave equipped with a stirrer was charged with 30 parts of the ethylene-acrylic acid copolymer, 66 parts of water and 3.60 parts of potassium hydroxide (1.0 chemical equivalent to the

group), and the mixture was heated and stirred at 140° C. for 1 hour.

Then, the autoclave was cooled and the content was taken out to obtain a white jelly-like emulsion. The particle size of the emulsion was smaller than 0.5 μm, and the amount of the neutralized

group was 2.1 millimole equivalents per gram of the polymer.

TABLE 1

| Example No. | Thermoplastic Resin Kind | Amount (parts) | Thermoplastic Polymer Kind | Amount (parts) | Basic Substance Kind | Amount (parts) |
|---|---|---|---|---|---|---|
| 1 | ethylene-1-butene copolymer resin *1 | 100 | ethylene-acrylic acid copolymer *4 | 10 | KOH | 1.20 |
| 2 | ethylene-1-butene copolymer resin *1 | 100 | ethylene-acrylic acid copolymer *4 | 10 | KOH | 1.20 |
| 3 | ethylene-1-butene copolymer resin *1 | 100 | ethylene-acrylic acid copolymer *4 | 1 | KOH | 0.12 |
| 4 | ethylene-1-butene copolymer resin *1 | 100 | ethylene-acrylic acid copolymer *4 | 60 | KOH | 7.20 |
| 5 | ethylene-1-butene copolymer resin *1 | 100 | ethylene-acrylic acid copolymer *4 | 10 | ethanolamine | 1.31 |
| 6 | low density polyethylene *2 | 100 | ethylene-acrylic acid copolymer *4 | 10 | ammonia | 0.36 |
| 7 | ethylene-vinyl acetate copolymer resin *3 | 100 | ethylene-acrylic acid copolymer *4 | 10 | KOH | 1.20 |
| 8 | ethylene-1-butene copolymer resin *1 | 100 | maleic anhydride-grafted polyethylene *5 | 10 | KOH | 0.38 |
| 9 | ethylene-1-butene copolymer resin *1 | 100 | maleinated polybutadiene *6 | 10 | KOH | 1.45 |
| 10 | ethylene-1-butene copolymer resin *1 | 100 | ethylene-ethyl acrylate resin *7 | 10 | KOH | 1.57 |
| 11 | ethylene-1-butene copolymer resin *1 | 100 | ethylene-acrylic acid copolymer resin *4 | 10 | KOH | 1.20 |

| Example No. | Water (parts) | Water Content (%) | Electric Resistance (Ω-cm) | Dispersion State | Average Particle Size | Amount (millimole equivalent) of Carboxylic Acid Salt *8 |
|---|---|---|---|---|---|---|
| 1 | 20 | 15 | $5 \times 10^3$ | good | 1.5 | 2.0 |
| 2 | 4 | 3 | $8 \times 10^4$ | good | 1.6 | 2.0 |
| 3 | 20 | 15 | $1 \times 10^4$ | good | 8.2 | 1.9 |
| 4 | 20 | 11 | $2 \times 10^3$ | good | 1.1 | 1.8 |
| 5 | 20 | 15 | $8 \times 10^3$ | good | 2.5 | 1.8 |
| 6 | 30 | 21 | $3 \times 10^3$ | good | 3.6 | 2.0 |
| 7 | 20 | 15 | $1 \times 10^3$ | good | 2.7 | 2.0 |
| 8 | 20 | 15 | $6 \times 10^3$ | good | 4.8 | 0.50 |
| 9 | 20 | 15 | $1 \times 10^3$ | good | 8.6 | 2.2 |
| 10 | 20 | 15 | $7 \times 10^3$ | good | 9.1 | 1.1 |

TABLE 1-continued

| | | | | | | |
|---|---|---|---|---|---|---|
| 11 | 6 | 5 | 9 × 10³ | good | 1.5 | 2.1 |

Note
*1: ethylene content = 93 mole %, MFR = 15 g/10 min, density = 0.89 g/cm³, Sp value = 7.84 (cal/cm³)^½
*2: density = 0.915 g/cm³, MFR = 70 g/10 min, Sp value = 7.80 (cal/cm³)^½
*3: vinyl acetate content = 19% by weight, MFR = 150 g/10 min, density = 0.97 g/cm³, Sp value = 8.06 (cal/cm³)^½
*4: A-C Polyethylene 5120 supplied by Allied Chemical, acrylic acid content = 15% by weight, viscosity = 650 cps (140° C.), density = 0.93 g/cm³, Sp value = 8.58 (cal/cm³)^½, —C(=O)—O— group content = 2.14 millimole equivalents per gram
*5: maleic anhydride content = 3.3% by weight, M̄w = 2700, density = 0.94 g/cm³, Sp value = 8.06 (cal/cm³)^½, —C(=O)—O— group content = 0.67 millimole equivalent per gram
*6: NISSOP-PBBN-1015 supplied by Nippon Soda, maleic anhydride content = 13% by weight, viscosity = 800 cps (45° C.), density = 0.86 g/cm³, Sp value = 9.53 (cal/cm³)^½, —C(=O)—O— group content = 2.65 millimole equivalents per gram
*7: ethyl acrylate content = 28% by weight, MFR = 200 g/10 min, density = 0.93 g/cm³, Sp value = 8.22 (cal/cm³)^½, —C(=O)—O— group content = 2.80 millimole equivalents per gram
*8: neutralized or saponified —C(=O)—O— group per gram of thermoplastic polymer

REFERENTIAL EXAMPLE 2

A normal pressure type kneader was charged with 100 parts of an ethylene-acrylic acid copolymer resin (AC Polyethylene 5120 supplied by Allied Chemical, acrylic acid content=15% by weight, viscosity=650 cps (140° C.), density=0.93 g/cm³, Sp value=8.58 (cal/cm³)^½,

group content=2.14 millimole equivalents per gram), and the copolymer resin was melt-kneaded at 140° C.

Then, 40 parts of an aqueous alkali solution containing 12.0 parts of potassium hydroxide (1.0 chemical equivalent to the

group) was gradually added dropwise to the kneaded resin, and after evaporation of water, melt kneading was further conducted for 30 minutes, followed by cooling. By the measurement using an infrared spectrophotometer, it was confirmed that the amount of the formed carboxylic acid salt was 2.10 millimole equivalents per gram of the polymer.

EXAMPLE 14

A compression type kneader was charged with 100 parts of an ethylene-1-butene copolymer (ethylene content=93 mole%, MFR=15 g/10 min, density=0.89 g/cm³, Sp value=7.84 (cal/cm³)^½) as the thermoplastic resin and 10 parts of the alkali metal salt of the thermoplastic polymer obtained in Referential Example 2, and the mixture was melt-kneaded at 140° C. for 30 minutes.

Then, 20 parts of water was pressed into the kneader over a period of 5 minutes by using a group connected to the kneader. The pressure in the kneader was elevated to 3 kg/cm²G.

Then, kneading was conducted for 30 minutes, and the kneader was cooled to 60° C. and the content was taken out. The content was a white solid.

The white solid was packed in a 1-cm cubic vessel and the electric resistance was measured. It was found that the electric resistance value was 6×10³ Ω-cm. Then, 10 parts of the white solid was thrown into 10 parts of water and the mixture was stirred by a turbine vane stirrer. When the formed dispersion was filtered through a 100-mesh net, no residual solid was found on the net.

The dispersion had a solid content of 42% by weight, a viscosity of 130 cps and a pH value of 9.7. When the size of dispersed particles was measured by Coulter Counter, it was found that the average particle size was 1.3μ.

EXAMPLE 15

A compression kneader was charged with an ethylene-vinyl acetate copolymer resin (vinyl acetate content=19% by weight, MFR=150 g/10 min, density=0.97 g/cm³, Sp value=8.06 (cal/cm³)^½) as the thermoplastic resin, 10 parts of maleic anhydride-grafted polyethylene (maleic anhydride content=3.3% by weight,

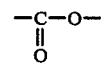

group content of 0.67 millimile equivalent/g, M̄w=2700, density=0.94 g/cm³, Sp value=8.06 (cal/cm³)^½) as the thermoplastic polymer and 5 parts of oleic acid as the organic compound forming an anionic surfactant by reaction with a basic substance, and the mixture was melt-kneaded at 140° C. for 30 minutes.

Then, 20 parts of an aqueous alkali solution containing 1.38 part (1.0 chemical equivalent) of potassium hydroxide necessary for neutralizing all the carboxylic acid of the thermoplastic polymer and organic compound was pressed into the kneader over a period of 5 minutes by using a pump connected to the kneader. The pressure in the kneader was elevated to 3 kg/cm²G. Then, kneading was conducted for 30 minutes, and the kneader was cooled to 60° C. and the content was taken out. The content was a white solid.

This white solid was packed in a 1-cm cubic vessel and the electric resistance value was measured. It was found that the electric resistance value was 1000 Ω-cm. Separately, 8 parts of the white solid was thrown into 10 parts of water and the mixture was stirred by a turbine vane stirrer, and the formed dispersion was filtered through a 100-mesh net. No residual solid was found on the net.

The dispersion had a solid content of 36% by weight, a viscosity of 150 cps and a pH value of 10.3. By the measurement using Coulter Counter, it was confirmed that the average particle size of dispersed particles was 0.5 μm. By the measurement using an infrared spectrophotometer, it was confirmed that the amount of the carboxylic acid salt formed in the thermoplastic polymer was 0.50 millimole equivalent as

per gram of the polymer.

EXAMPLES 16 THROUGH 27

Dispersions were prepared in the same manner as described in Example 15 by using ingredients shown in Table 2. The obtained results are shown in Table 2.

EXAMPLE 28

A 100/10/5 weight ratio mixture of the same ethylene-vinyl acetate copolymer resin and maleic anhydride-grafted polyethylene and oleic acid as used in Example 15 was supplied at a rate of 15 parts per hour into a biaxial screw extruder of the same direction rotation and engagement type (Model PCM-30 supplied by Ikegai Tekko, L/D=20), and a 23% aqueous solution of potassium hydroxide was continuously supplied from a supply opening formed in the vent portion of the extruder at a rate of 6 parts per hour. The mixture was continuously extruded at a heating temperature of 90° C.

The product was a white solid. The properties of the white solid are shown in Table 2.

EXAMPLE 29

The procedures of Example 15 were repeated in the same manner and after 20 parts of the aqueous alkali solution containing 1.38 parts of potassium hydroxide was pressed by the pump, 90 parts of water was subsequently pressed into the kneader and melt kneading was then carried out. Then, the kneader was cooled and the content was taken out. The content was a white liquid in which the resin was uniformly dispersed. The solid content was 49% by weight, the viscosity was 1430 cps and the pH value was 10.8. The average particle size of dispersed particles was 0.6 μm.

When the amount of the carboxylic acid salt formed in the thermoplastic polymer was determined, it was found that the amount of the carboxylic acid salt was 0.51 millimole equivalent as

per gram of the polymer.

REFERENTIAL EXAMPLE 3

A compression kneader was charged with 100 parts of the same ethylene-vinyl acetate copolymer resin as used in Example 15 and 10 parts of the same maleic anhydride-grafted polyethylene as used in Example 15, and melt kneading was carried out at 140° C. for 30 minutes.

Then, 20 parts of an aqueous alkali solution containing 0.38 part (1.0 chemical equivalent) of potassium hydroxide necessary for neutralizing all the carboxylic acid of the maleic anhydride-grafted polyethylene was pressed in the kneader by using a pump connected to the kneader over a period of 5 minutes. The subsequent operations were conducted in the same manner as described in Example 15. The product was a white solid having an electric resistance value of $7 \times 10^3$ Ω-cm and an average particle size of 5.2 μm.

COMPARATIVE EXAMPLE 1

A compression kneader was charged with 100 parts of an ethylene-vinyl acetate copolymer resin (vinyl acetate content=19% g/cm$^3$, Sp value=8.06 (cal/cm$^3$)$^{\frac{1}{2}}$) as the thermoplastic resin and 10 parts of maleic anhydride-grafted polyethylene (maleic anhydride content=3.3% by weight,

group content=0.67 millimole equivalent/g, $\overline{M}w$=2700, density=0.94 g/cm$^3$, Sp value=8.06 (cal/cm$^3$)$^{\frac{1}{2}}$) as the thermoplastic polymer, and the mixture was melt-kneaded at 140° C. for 30 minutes.

Then, 30 parts of an aqueous solution containing both of 5 parts of potassium oleate and 0.38 part (1.0 chemical equivalent) of potassium hydroxide necessary for neutralizing all the carboxylic acid of the thermoplastic polymer was pressed into the kneader by using a pump connected to the kneader over a period of 5 minutes. The pressure in the kneader was elevated to 3 kg/cm$^2$G.

Then, kneading was continued for 30 minutes, and the kneader was cooled to 60° C. and opened. The resin was separated from water and fine division of the resin solids was not observed at all. The electric resistance value was larger than $10^{10}$ Ω-cm.

COMPARATIVE EXAMPLE 2

The procedures of Example 15 were repeated in the same manner except that the thermoplastic polymer was not used and the amount of potassium hydroxide was changed to 1.00 part necessary for neutralizing all the carboxylic acid group of oleic acid.

After the aqueous alkali solution was pressed into the kneader, the kneader was cooled and opened. The resin was separated from water and fine division of the resin solids was not observed at all. The electric resistance value was larger than $10^{10}$ Ω-cm.

TABLE 2

| Example No. | Thermoplastic Resin | | Thermoplastic Polymer | | Organic Compound | |
|---|---|---|---|---|---|---|
| | Kind | Amount (parts) | Kind | Amount (parts) | Kind | Amount (parts) |
| 15 | ethylene-vinyl acetate copolymer resin *1 | 100 | maleic anhydride-grafted polyethylene *4 | 10 | oleic acid | 5 |
| 16 | ethylene-vinyl acetate | 100 | maleic anhydride-grafted | 10 | oleic acid | 5 |

TABLE 2-continued

| | | | | | |
|---|---|---|---|---|---|
| 17 | ethylene-vinyl acetate copolymer resin *1 | 100 | maleic anhydride-grafted polyethylene *4 | 10 | oleic acid | 1 |
| 18 | ethylene-vinyl acetate copolymer resin *1 | 100 | maleic anhydride-grafted polyethylene *4 | 10 | dodecyl benzene-sulfonic acid | 40 |
| 19 | ethylene-vinyl acetate copolymer resin *1 | 100 | maleic anhydride-grafted polyethylene *4 | 1 | oleic acid | 5 |
| 20 | ethylene-vinyl acetate copolymer resin *1 | 100 | maleic anhydride-grafted polyethylene *4 | 60 | oleic acid | 5 |
| 21 | ethylene-vinyl acetate copolymer resin *1 | 100 | maleic anhydride-grafted polyethylene *4 | 10 | oleic acid | 5 |
| 22 | low density polyethylene *2 | 100 | maleic anhydride-grafted polyethylene *4 | 10 | oleic acid | 5 |
| 23 | ethylene-1-butene copolymer resin *3 | 100 | maleic anhydride-grafted polyethylene *4 | 10 | lauric acid | 5 |
| 24 | ethylene-vinyl acetate copolymer resin *1 | 100 | ethylene-acrylic acid copolymer resin *5 | 10 | oleic acid | 5 |
| 25 | ethylene-vinyl acetate copolymer resin *1 | 100 | maleinated polybutadiene resin *6 | 10 | oleic acid | 5 |
| 26 | ethylene-vinyl acetate copolymer resin *1 | 100 | ethylene-ethyl acrylate resin *7 | 10 | oleic acid | 5 |
| 27 | ethylene-vinyl acetate copolymer resin *1 | 100 | maleic anhydride-grafted polyethylene *4 | 10 | stearic acid | 5 |
| 28 | ethylene-vinyl acetate copolymer resin *1 | 100 | maleic anhydride-grafted polyethylene *4 | 10 | oleic acid | 5 |

| | Basic Substance | | Water | Water | Product Electric Resistance ($\Omega$-cm) | Dispersion State | Average Particle Size ($\mu$m) | Amount (millimole equivalent) of Carboxylic Acid Salt *8 |
|---|---|---|---|---|---|---|---|---|
| Example No. | Kind | Amount (parts) | (parts) | Content (%) | | | | |
| 15 | KOH | 1.38 | 20 | 14 | $1 \times 10^3$ | good | 0.5 | 0.50 |
| 16 | KOH | 1.38 | 4 | 3 | $5 \times 10^5$ | good | 0.5 | 0.50 |
| 17 | KOH | 0.58 | 20 | 15 | $7 \times 10^4$ | good | 1.2 | 0.47 |
| 18 | KOH | 7.26 | 20 | 12 | $1 \times 10^3$ | good | 0.5 | 0.52 |
| 19 | KOH | 1.03 | 20 | 16 | $2 \times 10^3$ | good | 0.7 | 0.49 |
| 20 | KOH | 3.28 | 20 | 11 | $3 \times 10^4$ | good | 0.5 | 0.42 |
| 21 | ethanolamine | 1.50 | 20 | 15 | $3 \times 10^3$ | good | 1.2 | 0.51 |
| 22 | ammonia | 0.42 | 20 | 15 | $3 \times 10^3$ | good | 1.8 | 0.52 |
| 23 | KOH | 1.78 | 20 | 15 | $4 \times 10^3$ | good | 1.9 | 0.50 |
| 24 | KOH | 2.20 | 20 | 15 | $2 \times 10^3$ | good | 0.7 | 2.0 |
| 25 | KOH | 2.45 | 20 | 15 | $2 \times 10^3$ | good | 0.6 | 2.2 |
| 26 | KOH | 2.57 | 20 | 15 | $3 \times 10^3$ | good | 0.8 | 1.1 |
| 27 | KOH | 1.38 | 20 | 15 | $1 \times 10^3$ | good | 0.5 | 0.50 |
| 28 | KOH | 1.38 | 6 | 5 | $7 \times 10^3$ | good | 0.6 | 0.51 |

Note
*1: vinyl acetate content = 19% by weight, MFR = 150 g/10 min, density = 0.97 g/cm$^3$, Sp value = 8.06 (cal/cm$^3$)$^{\frac{1}{2}}$
*2: density = 0.915 g/cm$^3$, MFR = 70 g/10 min, Sp value = 7.80 (cal/cm$^3$)$^{\frac{1}{2}}$
*3: ethylene content = 93 mole %, MFR = 15 g/10 min, density = 0.89 g/cm$^3$, Sp value = 7.84 (cal/cm$^3$)$^{\frac{1}{2}}$
*4: maleic anhydride content = 3.3% by weight, Mw = 2700, density = 0.94 g/cm$^3$ Sp value = 8.06 (cal/cm$^3$)$^{\frac{1}{2}}$,
$-\overset{\overset{\displaystyle O}{\|}}{C}-O-$ group content = 0.67 millimole equivalent/g

*5: A-C Polyethylene 5120 supplied by Allied Chemical, acrylic acid content = 15% by weight, viscosity = 650 cps (140° C.), density = 0.93 g/cm$^3$, Sp value = 8.58 (cal/cm$^3$)$^{\frac{1}{2}}$, $-\overset{\overset{\displaystyle O}{\|}}{C}-O-$ group content = 2.14 millimole equivalents/g

*6: NISSO-PBBN-1015 supplied by Nippon Soda, maleic anhydride content = 13% by weight, viscosity = 800 cps (45° C.), density = 0.86 g/cm$^3$, Sp value = 9.53 (cal/cm$^3$)$^{\frac{1}{2}}$, $-\overset{\overset{\displaystyle O}{\|}}{C}-O-$ group content = 2.65 millimole equivalents/g

*7: ethyl acrylate content = 28% by weight, MFR = 200 g/10 min, density = 0.93 g/cm$^3$, Sp value = 8.22 (cal/cm$^3$)$^{\frac{1}{2}}$,
$-\overset{\overset{\displaystyle O}{\|}}{C}-O-$ group content = 2.80 millimole equivalents/g

*8: amount of neutralized or saponified $-\overset{\overset{\displaystyle O}{\|}}{C}-O-$ group per gram of thermoplastic polymer

EXAMPLE 30

A compression kneader was charged with 100 parts of an ethylene-vinyl acetate copolymer resin (vinyl acetate content=19% by weight, MFR rate=150 g/10 min, density=0.97 g/cm$^3$, Sp value=8.06 (cal/cm$^3$)$^{\frac{1}{2}}$) as the thermoplastic resin, 10 parts of maleic anhydride-grafted polyethylene (maleic anhydride content=3.3% by weight,  group content=0.67 millimole equivalent/g Mw=2700, density=0.94 g/cm$^3$, Sp value=8.06 (cal/cm$^3$)$^{\frac{1}{2}}$) as the thermoplastic polymer and 5 parts of potassium oleate as the anionic surfactant, and the mixture was melt-kneaded at 140° C. for 30 minutes.

Then, 20 parts of an aqueous alkali solution containing 0.38 part (1.0 chemical equivalent) of potassium hydroxide necessary for neutralizing all the carboxylic acid of the thermoplastic polymer was pressed into the kneader over a period of 5 minutes by using a pump connected to the kneader. Then, kneading was further conducted for 30 minutes, and the kneader was cooled to 60° C. and the content was taken out. The content was a white solid.

The white solid was packed in a 1-cm cubic vessel and the electric resistance value was measured. It was found that the electric resistance value was $2 \times 10^3$ Ω-cm. Separately, 8 parts of the white solid was thrown into 10 parts of water and the mixture was stirred by a turbine vane stirrer. The formed dispersion was filtered through a 100-mesh net. No residual solid was found on the net.

The dispersion had a solid content of 36% by weight, a viscosity of 110 cps and a pH value of 9.9. When the size of dispersed particles was measured by Coulter Counter, it was found that the average particle size was 0.6 μm. When the amount of the carboxylic acid salt formed in the thermoplastic polymer was measured by an infrared spectrophotometer, it was found that the amount of the carboxylic acid salt was 0.50 millimole equivalent as

group per gram of the polymer.

REFERENTIAL EXAMPLE 4

A normal pressure type kneader was charged with 100 parts of maleic anhydride-grafted polyethylene (maleic anhydride content=3.3% by weight, $\overline{M}w=2700$, density=0.94 g/cm³, Sp value=8.06 (cal/cm³)$^{\frac{1}{2}}$,

group content=0.67 millimole equivalent/g), and the polymer was melt-kneaded at 140° C.

Then, 12.5 parts of an aqueous alkali solution containing 3.76 parts of potassium hydroxide (1.0 chemical equivalent to the

group) was gradually added dropwise to the kneaded polymer. After evaporation of water, kneading was further conducted for 30 minutes, followed by cooling.

When the amount of the formed carboxylic acid salt was determined by using an infrared spectrophotometer, it was found that the amount of the carboxylic acid salt was 0.65 millimole equivalent as the

group per gram of the polymer.

EXAMPLE 31

A compression kneader was charged with 100 parts of an ethylene-vinyl acetate copolymer resin (vinyl acetate content=19% by weight, MFR=150 g/10 min, density=0.97 g/cm³, Sp value=8.06 (cal/cm³)$^{\frac{1}{2}}$) as the thermoplastic resin, 10 parts of the alkali salt of the thermoplastic polymer obtained in Referential Example 4 and 5 parts of potassium oleate, and the mixture was melt-kneaded at 140° C. for 30 minutes.

Then, 20 parts of water was pressed into the kneader over a period of 5 minutes by using a pump connected to the kneader. The pressure in the kneader was elevated to 3 kg/cm²G.

Then, kneading was further conducted for 30 minutes, and the kneader was cooled to 60° C. and the content was taken out. The content was a white solid.

When the white solid was packed in a 1-cm cubic vessel and the electric resistance value was measured, it was found that the electric resistance value was $1 \times 10^3$ Ω-cm. Separately, 8 parts of the white solid was thrown in 10 parts of water and the mixture was stirred by a turbine vane stirrer. When the dispersion was filtered through a 100-mesh net, no residual solid was found on the net.

The dispersion had a solid content of 38% by weight, a viscosity of 160 cps and a pH value of 9.8. When the size of dispersed particles was measured by Coulter Counter, it was found that the average particle size was 0.5 μm.

EXAMPLE 32

A kneader was charged with 100 parts of an ethylene-propylene copolymer elastomer (ethylene content=75 mole%, MFR=0.2 g/10 min, density 0.88 g/cm³, Sp value=7.97 (cal/cm³)$^{\frac{1}{2}}$) as the thermoplastic resin (i), 10 parts of maleic anhydride-grafted polyethylene (maleic anhydride content=3.3% by weight, $\overline{M}w=2700$, density=0.94 g/cm³, Sp value=8.06 (cal/cm³)$^{\frac{1}{2}}$,

content=0.67 millimole equivalent/g) as the thermoplastic polymer (ii), 5 parts of oleic acid as an organic compound forming an anionic surfactant by reaction with a basic substance and 100 parts of ethylene tetrachloride as the organic solvent, and the mixture was kneaded at 125° C. for 30 minutes. Then, 15 parts of an aqueous alkali solution containing 1.38 parts (1.0 chemical equivalent) necessary for neutralizing all the carboxylic acid of the thermoplastic polymer and organic compound was pressed into the kneader over a period of 5 minutes by using a pump connected to the kneader. The pressure in the kneader was elevated to 3 kg/cm³G.

Then, kneading was conducted for 30 minutes, and the kneader was cooled to 60° and opened. The content was a white viscous product. Then, 215 parts of water was added to the product, and the mixture was stirred to obtain an aqueous dispersion A having a water content of 52% by weight, a viscosity of 130 cps and a pH value of 10.1. The dispersion was heated at 60° C. and ethylene tetrachloride was removed under reduced pressure to obtain an aqueous dispersion B having a water content of 60% by weight, a viscosity of 80 cps and a pH value of 10.3.

When the sizes of the dispersed particles in the aqueous dispersions A and B were measured by Coulter Counter, it was found that the average particle size was 1.8 μm in the dispersion A and 1.6 μm in the dispersion B. When the amount of the carboxylic acid salt formed in the thermoplastic polymer was determined by using an infrared spectrophotometer, it was found that the amount of the carboxylic acid salt was 0.5 millimole equivalent as

per gram of the polymer.

EXAMPLES 33 THROUGH 46

Dispersions were prepared in the same manner as described in Example 32 by using ingredients shown in Table 3. The obtained results are shown in Table 3.

EXAMPLE 47

A 100/10/5 weight ratio mixture of the same ethylene-propylene copolymer elastomer and maleic anhydride-grafted polyethylene and oleic acid as used in Example 32 was supplied at a rate of 115 parts per hour from a hopper of a biaxial screw extruder of the same direction rotation and engagement type having two vent portions (Model PCM-45 supplied by Ikegai Tekko, L/D=30). Ethylene tetrachloride was continuously supplied at a rate of 100 parts per hour from an inlet opening formed in the first vent portion of the extruder, and a 9.2% aqueous solution of potassium hydroxide was continuously supplied at a rate of 15 parts per hour from an inlet opening formed in the second vent portion of the extruder. The mixture was continuously extruded at a heating temperature of 80° C. The product was a white viscous product. Emulsification and dispersion of the resin solids were confirmed.

COMPARATIVE EXAMPLE 3

The procedures of Example 32 were repeated in the same manner except that the thermoplastic polymer was not used and the amount of potassium hydroxide was changed to 1.00 part necessary for neutralizing all the carboxylic acid group of oleic acid.

After the aqueous alkali solution was pressed into the kneader, the kneader was cooled and opened. The resin swollen with the solvent was separated from water, and emulsification was not caused.

COMPARATIVE EXAMPLE 4

The procedures of Example 32 were repeated in the same manner except that oleic acid was not used and the amount of potassium hydroxide was changed to 0.38 part necessary for neutralizing all the carboxylic acid of the thermoplastic polymer.

After the aqueous alkali solution was pressed into the kneader, the kneader was cooled and opened. Water was intruded in the resin swollen with the solvent to produce a water/oil state, but emulsification was not caused.

COMPARATIVE EXAMPLE 5

A kneader was charged with 100 parts of the same thermoplastic resin as used in Example 32, 10 parts of the same thermoplastic polymer as used in Example 32 and 100 parts of ethylene tetrachloride as the organic solvent, and the mixture was kneaded at 125° C. for 30 minutes. Then, 30 parts of an aqueous solution containing both of 0.38 part (1.0 chemical equivalent) of potassium hydroxide necessary for neutralizing all the carboxylic acid of the thermoplastic polymer and 5 parts of potassium oleate was pressed into the kneader over a period of 5 minutes by a pump connected to the kneader. Then, the post opertions were conducted in the same manner as described in Example 32. When the kneader was opened, it was found that the resin was separated from water and emulsification was not caused.

TABLE 3

| Example No. | Thermoplastic Resin (i) Kind | Amount (parts) | Thermoplastic Polymer (ii) Kind | Amount (parts) | Organic Compound Kind | Amount (parts) | Organic Solvent Kind | Amount (parts) |
|---|---|---|---|---|---|---|---|---|
| 32 | ethylene-propylene copolymer elastomer *1 | 100 | maleic anhydride-grafted polyethylene *7 | 10 | oleic acid | 5 | ethylene tetra chloride | 100 |
| 33 | ethylene-propylene copolymer elastomer *1 | 100 | maleic anhydride-grafted polyethylene *7 | 1 | oleic acid | 5 | ethylene tetra chloride | 100 |
| 34 | ethylene-propylene copolymer elastomer *1 | 100 | maleic anhydride-grafted polyethylene *7 | 60 | oleic acid | 5 | ethylene tetra chloride | 100 |
| 35 | ethylene-propylene copolymer elastomer *1 | 100 | maleic anhydride-grafted polyethylene *7 | 10 | oleic acid | 1 | ethylene tetra chloride | 100 |
| 36 | ethylene-propylene copolymer elastomer *1 | 100 | maleic anhydride-grafted polyethylene *7 | 10 | dodecyl-benzene-sulfonic acid | 40 | ethylene tetra chloride | 100 |
| 37 | ethylene-propylene copolymer elastomer *1 | 100 | maleic anhydride-grafted polyethylene *7 | 10 | oleic acid | 40 | ethylene tetra chloride | 1000 |
| 38 | ethylene-propylene copolymer elastomer *2 | 100 | maleic anhydride-grafted polyethylene *8 | 10 | lauric acid | 5 | ethylene tetra chloride | 10 |
| 39 | ethylene-propylene copolymer elastomer *2 | 100 | maleic anhydride-grafted polyethylene *8 | 10 | oleic acid | 5 | ethylene tetra chloride | 100 |
| 40 | ethylene-propylene terpolymer *3 | 100 | maleic anhydride-grafted polyethylene *8 | 10 | oleic acid | 5 | hexane | 100 |
| 41 | ethylene-propylene terpolymer *3 | 100 | maleic anhydride-grafted polyethylene *8 | 10 | oleic acid | 5 | toluene | 100 |
| 42 | ethylene-propylene terpolymer *3 | 100 | ethylene-ethyl acrylate resin *9 | 10 | stearic acid | 5 | toluene | 100 |
| 43 | ethylene-vinyl acetate copolymer resin *4 | 100 | acrylic acid-grafted polyethylene *10 | 10 | oleic acid | 5 | ethylene tetrachloride | 100 |
| 44 | low density polyethylene *5 | 100 | acrylic acid-grafted polyethylene *10 | 10 | oleic acid | 5 | ethylene tetrachloride | 100 |
| 45 | high density polyethylene *6 | 100 | acrylic acid-grafted polyethylene *10 | 10 | oleic acid | 5 | ethylene tetrachloride | 100 |
| 46 | ethylene-propylene | 100 | maleic anhydride-grafted | 10 | oleic acid | 5 | ethylene | 100 |

TABLE 3-continued

| | copolymer elastomer *1 | | polyethylene *7 | | | | tetrachloride |
| --- | --- | --- | --- | --- | --- | --- | --- |
| | | | | | | Product | |
| Example No. | Basic Substance Kind | Amount (parts) | Water (parts) | Emulsion State | Water Content (wt %) | Average Particle Size (μm) | Amount (millimole equivalent/g) of Carboxylic Acid Salt *11 |
| 32 | KOH | 1.38 | 230 | good | 52 | 1.8 | 0.50 |
| 33 | KOH | 1.03 | 230 | good | 53 | 9.8 | 0.50 |
| 34 | KOH | 3.28 | 230 | good | 46 | 1.1 | 0.42 |
| 35 | KOH | 0.58 | 230 | good | 52 | 8.2 | 0.47 |
| 36 | KOH | 7.26 | 230 | good | 47 | 0.8 | 0.52 |
| 37 | KOH | 8.34 | 530 | good | 31 | 2.4 | 0.51 |
| 38 | KOH | 1.87 | 230 | good | 64 | 4.5 | 1.4 |
| 39 | ethanolamine | 1.60 | 230 | good | 51 | 2.0 | 1.5 |
| 40 | ammonia | 0.45 | 230 | good | 52 | 1.7 | 1.5 |
| 41 | KOH | 1.47 | 230 | good | 51 | 1.8 | 1.4 |
| 42 | KOH | 2.56 | 230 | good | 51 | 5.4 | 1.1 |
| 43 | KOH | 1.19 | 230 | good | 52 | 3.3 | 0.30 |
| 44 | KOH | 1.19 | 230 | good | 52 | 2.7 | 0.31 |
| 45 | KOH | 1.19 | 230 | good | 52 | 2.1 | 0.29 |
| 46 | KOH | 1.38 | 15 | good | 6 | 1.9 | 0.51 |

Note
*1: ethylene content = 75 mole %, MFR = 0.2 g/10 min, density = 0.88 g/cm$^3$, Sp value = 7.97 (cal/cm$^3$)$^{\frac{1}{2}}$
*2: ethylene content = 75 mole %, MFR = 6.0 g/10 min, density = 0.88 g/cm$^3$, Sp value = 7.97 (cal/cm$^3$)$^{\frac{1}{2}}$
*3: ethylene content = 65 mole %, MFR = 0.4 g/10 min, density = 0.87 g/cm$^3$, Sp value = 8.03 (cal/cm$^3$)$^{\frac{1}{2}}$
*4: vinyl acetate content = 28% by weight, MFR = 6.2 g/10 min, density = 0.95 g/cm$^3$, Sp value = 8.19 (cal/cm$^3$)$^{\frac{1}{2}}$
*5: density = 0.923 g/cm$^3$, MFR = 0.9 g/10 min, Sp value = 7.80 (cal/cm$^3$)$^{\frac{1}{2}}$
*6: density = 0.968 g/cm$^3$, MFR = 5.5 g/10 min, Sp value = 7.80 (cal/cm$^3$)$^{\frac{1}{2}}$
*7: maleic anhydride content = 3.3% by weight, $\overline{Mw}$ = 2700, density = 0.94 g/cm$^3$, Sp value = 8.06 (cal/cm$^3$)$^{\frac{1}{2}}$, $-\underset{\underset{O}{\parallel}}{C}-O-$ group content = 0.67 millimole equivalent/g

*8: maleic anhydride content = 8.2% by weight, $\overline{Mw}$ = 3100, density = 0.95 g/cm$^3$, Sp value = 8.42 (cal/cm$^3$)$^{\frac{1}{2}}$, $-\underset{\underset{O}{\parallel}}{C}-O-$ group content = 1.67 millimole equivalents/g

*9: ethyl acrylate content = 28% by weight, MFR = 200 g/10 min, density = 0.93 g/cm$^3$, Sp value = 8.22 (cal/cm$^3$)$^{\frac{1}{2}}$, $-\underset{\underset{O}{\parallel}}{C}-O-$ group content = 2.80 millimole equivalents/g

*10: acrylic acid content = 2.5% by weight, $\overline{Mw}$ = 2500, density = 0.94 g/cm$^3$, Sp value = 7.94 (cal/cm$^3$)$^{\frac{1}{2}}$, $-\underset{\underset{O}{\parallel}}{C}-O-$ group content = 0.35 millimole equivalent/g

*11: amount of neutralized or saponified $-\underset{\underset{O}{\parallel}}{C}-O-$ group per gram of thermoplastic polymer

EXAMPLE 48

A kneader was charged with 100 parts of polyethylene having a weight average molecular weight ($\overline{Mw}$) of 3,000,000 (density=0.935 g/cm$^3$, melting point=136° C., Sp value=7.80 (cal/cm$^3$)$^{\frac{1}{2}}$) as the super-high molecular weight thermoplastic resin, 10 parts of maleic anhydride-grafted polyethylene (maleic anhydride content=3.3% by weight, $\overline{Mw}$=2700, density=0.94 g/cm$^3$, Sp value=8.06 (cal/cm$^3$)$^{\frac{1}{2}}$,

group content=0.67 millimole equivalent/g) as the carboxylic acid salt group-containing thermoplatic polymer, 5 parts of oleic acid as the organic compound forming an anionic surfactant by eaction with a basic substance and 700 parts of toluene as the organic solvent, and the mixture was melt-kneaded at 150° C. for 30 minutes. Then, 15 parts of an aqueous alkali solution containing 1.38 parts (1.0 chemical equivalent) of potassium hydroxide necessary for neutralizing all the carboxylic acid of the thermoplastic polymer and organic compound was pressed into the kneader by using a pump connected to the kneader over a period of 5 minutes. Then, 400 parts of water was pressed in the kneader over a period of 60 minutes. The pressure in the kneader was elevated to 7 kg/cm$^2$G.

Then, the mixture was further kneaded for 30 minutes, and the kneader was cooled to 60° C. and opened. The content was a white liquid dispersion.

Then, the dispersion was heated at 60° C. and toluene as the solvent was removed under reduced pressure to obtain an aqueous liquid dispersion having a solid content of 33% by weight, a viscosity of 90 cps and a pH value of 10.1.

When the size of dispersed particles was measured by Coulter Counter, it was found that the average particle size was 1.8 μm.

When the amount of the carboxylic acid salt formed in the thermoplastic polymer was determined by using an infrared spectrophotometer, it was found that the amount of the carboxylic acid salt was 0.52 millimole equivalent as $-\underset{\underset{O}{\parallel}}{C}-O-$ per gram of the polymer.

EXAMPLE 49

The procedures of Example 48 were repeated in the same manner except that a saponified ethylene-ethyl acrylate resin shown in Referential Example 5 given hereinafter was used as the thermoplastic polymer resin and the amount added of potassium hydroxide was changed to 1.0 part. The obtained liquid aqueous dispersion had a solid content of 35% by weight, a viscosity of 85 cps and a pH value of 9.9, and the average size of dispersed particles was 2.0 μm.

REFERENTIAL EXAMPLE 5

A normal pressure kneader was charged with 100 parts of an ethylene-ethyl acrylate resin (ethyl acrylate content=28% by weight, MFR=200 g/10 min (190° C.), density=0.93 g/cm$^3$, Sp value=8.22 (cal/cm$^3$)$^{\frac{1}{2}}$,

group content=2.80 millimole equivalents/g), and the resin was melt-kneaded at 140° C.

Then, 30 parts of an aqueous alkali solution containing 6.28 parts (0.4 chemical equivalent to the

group) was gradually added dropwise to the kneaded resin, and after evaporation of water, kneading was further conducted for 30 minutes, followed by cooling.

When the amount of the carboxylic acid salt formed by saponification was determined by using an infrared spectrophotometer, it was found that the amount of the carboxylic acid salt was 1.10 millimole equivalents per gram of the polymer.

EXAMPLE 50

A kneader was charged with 100 parts of an ethylene-propylene copolymer elastomer (ethylene content=75 mole%, MFR=0.2 g/10 min, density=0.88 g/cm$^3$, Sp value=7.97 (cal/cm$^3$)$^{\frac{1}{2}}$) as the thermoplastic resin (i), 10 parts of maleic anhydride-grafted polyethylene (maleic anhydride content=3.3% by weight, $\bar{M}w$=2700, density=0.94 g/cm$^3$, Sp value=8.06 (cal/cm$^3$)$^{\frac{1}{2}}$,

group content=0.67 millimole equivalent/g) as the thermoplastic polymer (ii), 5 parts of potassium oleate as the anionic surfactant and 100 parts of ethylene tetrachloride as the oranic solvent, and the mixture was kneaded at 125° C. for 30 minutes. Then, 15 parts of an aqueous alkali solution containing 0.38 part (1.0 chemical equivalent) of potassium hydroxide necessary for neutralizing all the carboxylic acid of the thermoplastic polymer was pressed into the kneader over a period of 5 minutes by using a pump connected to the kneader. The pressure in the kneader was elevated to 3 kg/cm$^2$G.

Kneading was conducted for 30 minutes, and the kneader was cooled to 60° C. and opened. The content was a white viscous product. Then, 215 parts of water was added to the viscous product and the mixture was stirred to obtain an aqueous dispersion A having a water content of 52% by weight, a viscosity of 110 cps and a pH value of 9.8. The dispersion was heated at 60° C. and ethylene tetrachloride as the solvent was removed under reduced pressure to obtain an aqueous dispersion B having a water content of 60% by weight, a viscosity of 80 cps and a pH value of 9.9.

When sizes of dispersed particles of the aqueous dispersions A and B were measured by Coulter Counter, it was found that the average particle size was 1.7 μm in the dispersion A and 1.6 μm in the dispersion B. When the amount of the carboxylic acid salt formed in the thermoplastic polymer was determined by using an infrared spectrophotometer, it was found that the amount of the carboxylic acid salt was 0.5 millimole equivalent as the

group per gram of the polymer.

REFERENTIAL EXAMPLE 6

A normal pressure type kneader was charged with 100 parts of maleic anhydride-grafted polyethylene (maleic anhydride content=3.3% by weight, $\bar{M}w$=2700, density=0.94 g/cm$^3$, Sp value=8.06 (cal/cm$^3$)$^{\frac{1}{2}}$,

group content=0.67 millimole equivalent/g), and the resin was melt-kneaded at 140° C.

Then, 12.5 parts of an aqueous alkali solution containing 3.76 parts (1.0 chemical equivalent to the group

of potassium hydroxide was gradually added dropwise to the kneaded resin, and after evaporation of water, kneading was further conducted for 30 minutes, followed by cooling.

When the amount of the formed carboxylic acid salt was measured by using an infrared spectrophotometer, it was found that the amount of the carboxylic acid salt was 0.65 millimole equivalent as the

group per gram of the polymer.

REFERENTIAL EXAMPLE 7

The procedures of Referential Example 6 were repeated in the same manner except that maleinated polybutadiene (NISSO-PBBN-1015 supplied by Nippon Soda, maleic anhydride content=13% by weight, viscosity=800 cps (45° C.), density=0.86 g/cm$^3$, Sp value=9.53 (cal/cm$^3$)$^{\frac{1}{2}}$,

group content=2.65 millimole equivalents/g) was used and 35.3 parts of an aqueous alkali solution containing 10.6 parts (1.0 chemical equivalent to the

group) of sodium hydroxide was added dropwise.

When the amount of the formed carboxylic acid salt was measured, it was found that the amount of the carboxylic acid salt was 2.58 millimole equivalents per gram of the polymer.

REFERENTIAL EXAMPLE 8

Saponification was caused and a carboxylic acid salt was formed in the same manner as described in Referential Example 6 except that an ethylene-ethyl acrylate resin (ethyl acrylate content=28% by weight, MFR=200 g/10 min (190° C.), density=0.93 g/cm$^3$, Sp value=8.22 (cal/cm$^3$)$^{\frac{1}{2}}$,

group content=2.80 millimole equivalent/g) was used and 15 parts of an aqueous alkali solution containing 4.5 parts (0.4 chemical equivalent to the

group) of sodium hydroxide was added dropwise.

When the amount of the formed carboxylic acid salt was measured, it was found that the amount of the carboxylic acid salt was 1.10 millimole equivalents per gram of the polymer.

EXAMPLE 51

A kneader was charged with (a) 100 parts of an ethylene-propylene copolymer elastomer (ethylene content=75 mole%, MFR=0.2 g/10 min, density=0.88 g/cm$^3$, Sp value=7.97 (cal/cm$^3$)$^{\frac{1}{2}}$) as the thermoplastic resin, (b) 10 parts of maleic anhydride-grafted polyethylene (maleic anhydride content=3.3% by weight, $\overline{Mw}$=2700, density=0.94 g/cm$^3$, Sp value=8.06 (cal/cm$^3$)$^{\frac{1}{2}}$,

group cotnent=0.67 millimole equivalent/g) as the thermoplastic polymer, (c) 5 parts of oleic acid as the organic compound forming an anionic surfactant by reaction with a basic substance and (d) 100 parts of Diana Process Oil PW-90 (supplied by Idemitsu Kosan, average molecular weight=539) as the mineral oil, and the mixture was kneaded at 125° C. for 30 minutes. Then, 15 parts of an aqueous alkali solution containing 1.38 parts (1.0 chemical equivalent) of potassium hydroxide necessary for neutralizing all the carboxylic acid of the thermoplastic polymer and organic compound was pressed into the kneader over a period of 5 minutes by using a pump connected to the kneader. The pressure in the kneader was elevated to 3 kg/cm$^2$G.

Then, kneading was continued for 30 minutes, and the kneader was cooled to 60° C. and opened. The content was a white viscous product. Then, 215 parts of water was added to the viscous product and the mixture was stirred to obtain a liquid aqueous dispersion having a water content of 52% by weight, a viscosity of 95 cps and a pH value of 10.2. When the size of dispersed particles was measured by Coulter Counter, it was found that the average particle size was 1.9 μm.

When the amount of the carboxylic acid salt formed in the thermoplastic polymer was determined by using an infrared spectrophotometer, it was found that the amount of the carboxylic acid salt was 0.5 millimole equivalent as

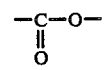

per gram of the polymer.

EXAMPLES 52 THROUGH 57

Aqueous dispersions were prepared in the same manner as in Example 51 by using ingredients shown in Table 4.

The obtained results are shown in Table 4.

EXAMPLE 58

A 100/10/5 weight ratio mixture of the same ethylene-propylene copolymer elastomer and maleic anhydride-grafted polyethylene and oleic acid as used in Example 51 was supplied at a rate of 115 parts per hour into a biaxial screw extruder of the same direction rotation and engagement type having two vent portions (Model PCM-45 supplied by Ikegai Tekko, L/D=30), and Process Oil PW-90 was continuously supplied at a rate of 100 parts per hour from an inlet opening formed in the first vent portion of the extruder and a 9.2% aqueous solution of potassium hydroxide was continuously supplied at a rate of 15 parts per hour from an inlet opening formed in the second vent portion by means of a pump. The mixture was continuously extruded at a heating temperature of 80° C. The product was a white viscous product. The properties are shown in Table 4.

TABLE 4

| Example No. | Thermoplastic Resin (a) Kind | Amount (parts) | Thermoplastic Polymer (b) Kind | Amount (parts) | Anionic Surfactant (c) Kind | Amount (parts) | Mineral or Synthetic Oil (d) Kind | Amount (parts) |
|---|---|---|---|---|---|---|---|---|
| 51 | ethylene-propylene copolymer elastomer *1 | 100 | maleic anhydride-grafted polyethylene *4 | 10 | oleic acid | 5 | Process Oil PW-90 *8 | 100 |
| 52 | ethylene-propylene copolymer elastomer *1 | 100 | shown in Referential Example 6 | 1 | potassium oleate | 40 | Process Oil PW-90 *8 | 100 |

TABLE 4-continued

| Example No. | Resin (a) Kind | Amount | Polymer (b) Kind | Amount | Surfactant Kind | Amount | Oil Kind | Amount |
|---|---|---|---|---|---|---|---|---|
| 53 | ethylene-propylene copolymer elastomer *1 | 100 | ethylene-acrylic acid copolymer *5 | 60 | sodium dodecylbenzene-sulfonate | 5 | Process Oil NS-24 *9 | 100 |
| 54 | ethylene-propylene copolymer elastomer *2 | 100 | acrylic acid-grafted polyethylene *6 | 10 | stearic acid | 1 | ethylene-α-olefin oligomer *10 | 10 |
| 55 | ethylene-propylene copolymer elastomer *2 | 100 | shown in Referential Exam. 7 | 10 | sodium laurate | 5 | ethylene-α-olefin oligomer *11 | 500 |
| 56 | ethylene-propylene terpolymer *3 | 100 | maleic anhydride-grafted polyethylene *7 | 10 | potassium oleate | 5 | Process Oil PW-90 *8 | 100 |
| 57 | ethylene-propylene terpolymer *3 | 100 | shown in Referential Exam. 8 | 10 | potassium stearate | 5 | Process Oil PW-90 *8 | 100 |
| 58 | ethylene-propylene copolymer elastomer *1 | 100 | maleic anhydride-grafted polyethylene *7 | 10 | oleic acid | 5 | Process Oil PW-90 *8 | 100 |

| Example No. | Basic Substance Kind | Amount (parts) | Water (parts) | Emulsion State | Product Water Content (% by weight) | Average Particle Size (μm) | Amount of Carboxylic Acid Salt (millimole equivalent/g) |
|---|---|---|---|---|---|---|---|
| 51 | KOH | 1.38 | 230 | good | 52 | 1.9 | 0.50 |
| 52 | — | — | 230 | good | 49 | 3.3 | 0.65 |
| 53 | NaOH | 5.14 | 230 | good | 46 | 1.1 | 2.00 |
| 54 | NaOH | 0.28 | 230 | good | 66 | 1.6 | 0.30 |
| 55 | — | — | 500 | good | 45 | 0.8 | 2.58 |
| 56 | KOH | 0.94 | 230 | good | 52 | 1.7 | 1.40 |
| 57 | — | — | 230 | good | 52 | 2.5 | 1.10 |
| 58 | KOH | 1.38 | 15 | good | 6 | 1.7 | 0.51 |

Note
*1: ethylene content = 75 mole %, MFR = 0.2 g/10 min, density = 0.88 g/cm$^3$, Sp value = 7.97 (cal/cm$^3$)$^{\frac{1}{2}}$
*2: ethylene content = 75 mole %, MFR = 6.0 g/10 min, density = 0.88 g/cm$^3$, Sp value = 7.97 (cal/cm$^3$)$^{\frac{1}{2}}$
*3: ethylene content = 65 mole %, MFR = 0.4 g/10 min, density = 0.87 g/cm$^3$, Sp value = 8.03 (cal/cm$^3$)$^{\frac{1}{2}}$
*4: maleic anhydride content = 3.3% by weight, Mw = 2700, density = 0.94 g/cm$^3$, Sp value = 8.06 (cal/cm$^3$)$^{\frac{1}{2}}$,
$-\underset{\underset{O}{\|}}{C}-O-$ group content = 0.67 millimole equivalent/g

*5: AC Polyethylene 5120 supplied by Allied Chemical, acrylic acid content = 15% by weight, viscosity = 650 cps (140° C.), density = 0.93 g/cm$^3$, Sp value = 8.53 (cal/cm$^3$)$^{\frac{1}{2}}$, $-\underset{\underset{O}{\|}}{C}-O-$ group content = 2.14 millimole equivalents/g

*6: acrylic acid content = 2.5% by weight, $\overline{Mw}$ = 2500, density = 0.94 g/cm$^3$, Sp value = 7.94 (cal/cm$^3$)$^{\frac{1}{2}}$,
$-\underset{\underset{O}{\|}}{C}-O-$ group content = 0.35 millimole equivalent/g

*7: maleic acid content = 8.2% by weight, $\overline{Mw}$ = 3100, density = 0.95 g/cm$^3$, Sp value = 8.42 (cal/cm$^3$)$^{\frac{1}{2}}$,
$-\underset{\underset{O}{\|}}{C}-O-$ group content = 1.67 millimole equivalents/g

*8: supplied by Idemitsu Kosan, specific gravity = 0.870 (15/4° C.), kinetic viscosity = 96 cst (40° C.), average molecular weight = 539
*9: supplied by Idemitsu Kosan, specific gravity = 0.907 (15/4° C.), kinetic viscosity = 24 cst (40° C.), average molecular weight = 315
*10: specific gravity = 0.830 (20/4° C.), kinetic viscosity = 160 cst (40° C.), average molecular weight = 800
*11: specific gravity = 0.843 (20/4° C.), kinetic viscosity = 2000 cst (40° C.), average molecular weight = 1500

We claim:

1. A process for the preparation of aqueous dispersions, which comprises (i) melt-kneading (a) a hydrophobic thermoplastic resin selected from the group consisting of polyolefins, ethylene/vinyl compound copolymers, styrene resins, polyvinyl chloride, polyvinylidene chloride, vinyl chloride-vinylidene chloride copolymer, polymethylacrylate, polymethyl methacrylate, polyamides, thermoplastic polyesters, polycarbonates and polyphenylene oxides and (b) a water-insoluble and non-water-swelling thermoplastic polymer containing at least one of a neutralizable or saponifiable carboxylic acid or its anhydride or ester group bonded to the polymer chain at a concentration of at least 0.1 millimole equivalent as $$-\underset{\underset{O}{\|}}{C}-O-$$

per gram of the polymer and having a good compatibility with the thermoplastic resin (a) or at least one of a neutralized or saponified product of said water-insoluble and non-water-swelling thermoplastic polymer, said product containing a carboxylic acid salt group at a concentration of 0.1 to 5 millimole equivalent as $$-\underset{\underset{O}{\|}}{C}-O-$$

per gram of the polymer, the polymer (b) being present in an amount of 1 to 60 parts by weight per 100 parts by weight of the resin (a); (ii) adding water to the kneaded composition in an amount of 3 to 25% by weight based on the total composition, and further adding a base in an amount sufficient to form 0.1 to 5 millimole equivalents of a carboxylic acid salt per gram of the polymer (b) when the polymer (b) is in the non-neutralized state; and (iii) continuing to melt-knead the melt-kneaded mixture to cause phase inversion and form an apparently solid oil-in-water aqueous dispersion of the resin solids; steps (i) through (iii) being conducted simultaneously or in the recited order.

2. The process according to claim 1 wherein the resin (a) is a polyolefin, the polymer (b) is a copolymer comprising the same monomer as the monomer constituting the polyolefin (a) and an ethylenically unsaturated carboxylic acid or its anhydride or ester, or a neutralized or saponified product of said copolymer, and the difference of the solubility parameter (Sp value) between the polyolefin and the copolymer is less than 2 $(cal/cm^3)^{\frac{1}{2}}$.

3. The process according to claim 1 wherein the aqueous dispersion is an oil-in-water dispersion in which the solids have a number average particle size smaller than 10 μm.

4. The process of claim 1 wherein the thermoplastic resin (a) has a melt flow rate of at least 5 g/10 min.

5. The process of claim 1 which further comprises in the step (i) adding (c) an anionic surfactant or an organic compound forming an anionic surfactant by reaction with a basic substance to the hydrophobic thermoplastic resin (a) and the water-insoluble and non-water-swelling thermoplastic polymer (b) in an amount of 1 to 40 parts by weight per 100 parts by weight of the thermoplastic resin (a).

6. The process of claim 5 wherein the thermoplastic resin (a) is a super-high molecular weight polyolefin having a weight average molecular weight higher than 500,000 and the polymer (b) is a carboxylic acid-modified polyolefin.

7. The process of claim 5 which further comprises in step (i) adding to the resin (a), polymer (b) and anionic surfactant or organic compound (c), from 10 to 1,000 parts by weight, per 100 parts by weight of the resin (a) of an organic solvent capable of dissolving or swelling the resin (a).

8. The process of claim 5 which further comprises in step (i) adding to the resin (a), polymer (b) and anionic surfactant or organic compound (c) from 10 to 500 parts by weight, per 100 parts by weight of the resin (a), of (e) a natural oil or synthetic oil having a number average molecular weight of at least 200.

9. The process of claim 1 which further comprises step (iv) combining the apparently solid oil-in-water aqueous dispersion formed in step (iii) with additional water to obtain an aqueous dispersion containing from 35 to 90 percent by weight, based on the total aqueous dispersion, of water.

10. The process of claim 1 wherein step (i) of melt-kneading is carried out at a temperature higher than the temperature resulting in a melt viscosity lower than $10^6$ poise.

11. The process of claim 10 wherein the melt kneading is at a temperature higher than the temperature giving a melt viscosity lower than $10^5$ poise.

12. The process of claim wherein step (i), (ii) and (iii) are conducted simultaneously.

13. The process of claim 1 wherein steps (i), (ii) and (iii) are conducted in the recited order.

* * * * *

UNITED STATES PATENT AND TRADEMARK OFFICE
CERTIFICATE OF CORRECTION

PATENT NO. : 4,775,713

DATED : October 4, 1988

INVENTOR(S) : SHIRO HOMMA ET AL.

It is certified that error appears in the above-identified patent and that said Letters Patent is hereby corrected as shown below:

Claim 12, line 1, after "claim", insert --1--;

line 1, delete "step" and insert --steps--.

Signed and Sealed this

Seventh Day of March, 1989

Attest:

DONALD J. QUIGG

Attesting Officer

Commissioner of Patents and Trademarks